UNITED STATES PATENT OFFICE.

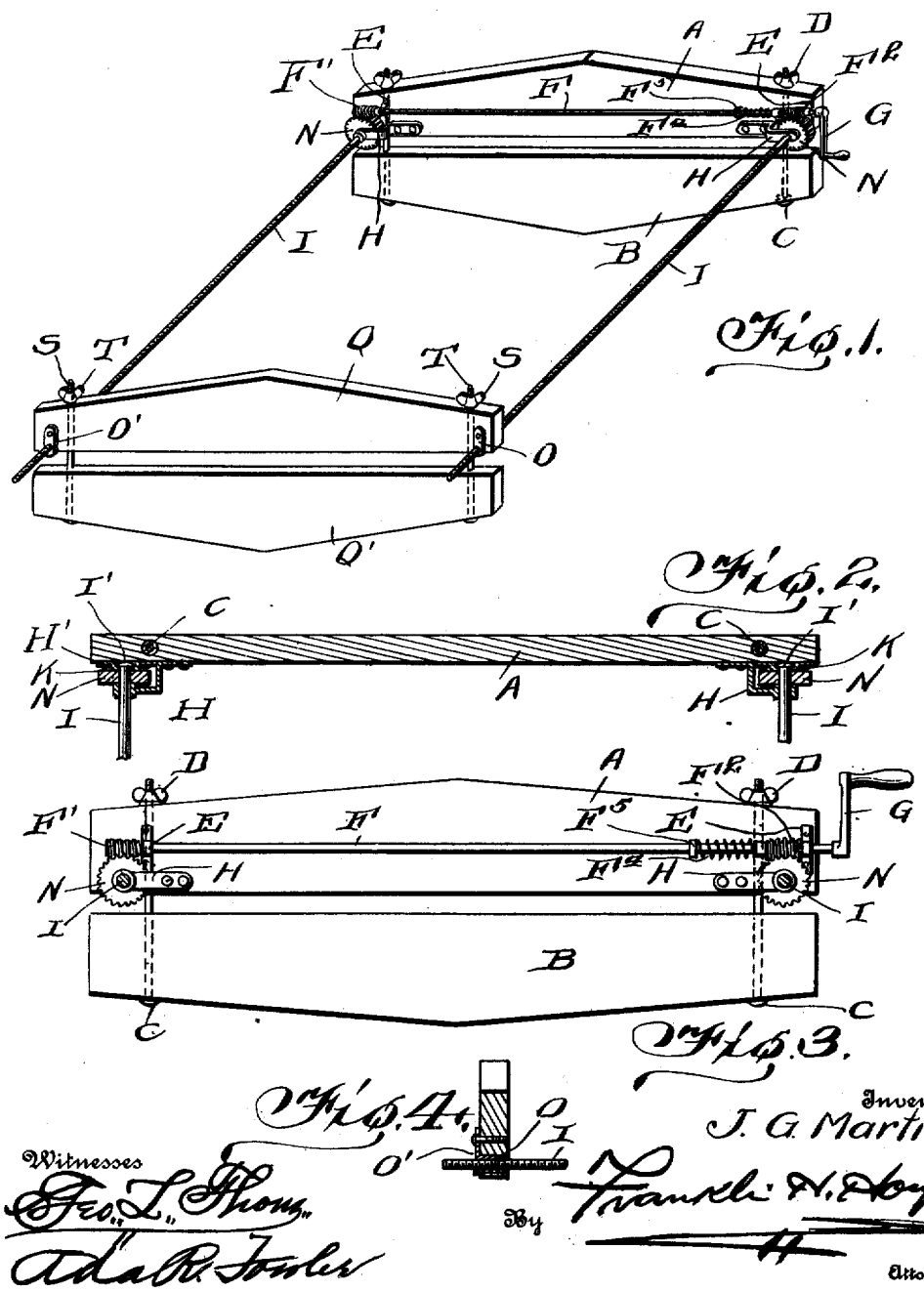

JULIAN G. MARTIN, OF DRYBRANCH, GEORGIA.

BELT-TIGHTENER.

969,968.  Specification of Letters Patent.  Patented Sept. 13, 1910.

Application filed June 1, 1910. Serial No. 564,525.

*To all whom it may concern:*

Be it known that I, JULIAN G. MARTIN, a citizen of the United States, residing at Drybranch, in the county of Bibb and State of Georgia, have invented certain new and useful Improvements in Belt-Tighteners; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in belt tightening devices and the object in view is to produce a simple and efficient device of this nature having means for securely clamping the ends of the belt and mechanism for drawing the ends together.

The invention comprises various details of construction and combinations and arrangements of parts which will be hereinafter fully described and then specifically defined in the appended claims.

I illustrate my invention in the accompanying drawings, in which:—

Figure 1 is a perspective view of my improved belt tightening apparatus. Fig. 2 is a longitudinal sectional view through one of the clamping members. Fig. 3 is a sectional view showing clamping members in elevation, and Fig. 4 is a detail sectional view of a part of the invention.

Reference now being had to the details of the drawings by letter, A and B designate clamping members each having registering apertures formed therein for the reception of the tightening screws C upon the threaded ends of which are the winged nuts D, whereby, as the nuts are tightened, the clamping members may be brought into frictional contact with the end of a belt. Said member A is provided with bearing members E in which the shaft F is journaled, having worms F' and F² at the ends thereof and also a handle G, forming means whereby the shaft F may be rotated. It will be noted that one of said worms F² has a sliding movement upon the shaft F and is held normally in mesh with the pinion N by means of a coiled spring F⁴ which bears between a collar F⁵ fixed to the shaft F and the adjacent end of the worm. By moving the spring-actuated worm out of mesh with the adjacent pinion N, it will allow the opposite edge of the belt being engaged by the clamps to be stretched more than the side adjacent to the spring-actuated worm and which tightening may be essential where the ends of the belt fastened together are not spliced together with the opposite edges of the belt in true alinement. This unevenness of the belts will sometimes occur where the latter are of considerable width and which may pass about uneven pulleys.

Fixed to the clamping member A are the bracket arms H, each of which has an aperture forming a bearing for corresponding ends of the shafts I and each end of the shaft I adjacent to the bearing in which it is mounted has a head I' which turns in a recess K formed in an integral projecting portion H' of the bracket H, as shown clearly in Fig. 2 of the drawings. Said projection H' has an aperture in which the shaft I has a bearing and interposed between the projection H' and the outer part of the bracket member in which the shaft I is journaled is a worm wheel N which is fixed to the shaft I. Said shafts I, which are identical in construction and mounted parallel to each other, are threaded substantially their entire length and each passes through a boss O which is interiorly threaded, a detail of said boss being shown in Fig. 4 of the drawings, and each boss has a laterally projecting part O' which is fastened to one of the clamping members Q which latter coöperates with a similar clamping member Q' to engage and hold the other end of the belt to be stretched or tightened, the two clamping members Q and Q' being identical to the members A and B before described and held in clamping relation with the end of the belt by means of the screws S upon which the winged nuts T are mounted.

The operation of my invention will be readily understood and is as follows:—One end of the belt being placed between the clamping members A and B may be clamped and held securely by said members by tightening the winged nuts D. The other end of the belt is similarly clamped and securely held by the members Q and Q'. When it is desired to stretch the belt or draw the ends toward each other, it may be done by turning the crank handle G which will cause, through the gear connections shown, the two shafts I to rotate in similar directions, thus causing the two sets of clamping jaws to be drawn toward each other until the desired tension upon the belt has been attained, after which the ends of the belt may be fastened together by lacing or any other suitable means.

What I claim to be new is:—

1. A belt tightening apparatus comprising two pairs of clamping members, means for holding the same against the belt, bracket arms fastened to one of said members, each of said bracket arms having parallel portions which are provided with registering apertures and one of said projections having a countersunken portion about the aperture therein, threaded shafts journaled in said apertures and each having a head seated in said countersunken portion of the bracket arm, a worm wheel fixed to each shaft intermediate said parallel portions of the bracket arm, a worm shaft journaled upon the bracket member to which said arms are fastened and in mesh with said worm wheels, interiorly threaded bushings mounted upon one of the other of said sets of clamping members and adapted to engage the threaded portions of said shafts.

2. A belt tightening apparatus comprising two pairs of clamping members, means for holding the same against the belt, bracket arms fastened to one of said members, each of said bracket arms having parallel portions which are provided with registering apertures and one of said projections having a countersunken portion about the aperture therein, threaded shafts journaled in said apertures and each having a head seated in said countersunken portion of the bracket arm, a worm wheel fixed to each shaft intermediate said parallel portions of the bracket arm, a worm shaft journaled upon the bracket member to which said arms are fastened and in mesh with said worm wheels, interiorly threaded bushings each having a laterally projecting portion fastened to one of the clamping members of the other set, said bushings receiving the threaded shafts.

In testimony whereof I hereunto affix my signature in the presence of witnesses.

JULIAN G. MARTIN.

Witnesses:
J. A. DUNWODY,
A. R. MATTHEWS,
HENRY M. SHARP.